Dec. 13, 1932.  J. F. WILLIAMS  1,890,963
AUTOMOBILE LIFT
Filed July 17, 1931   3 Sheets-Sheet 1

Inventor
J. F. Williams
By Clarence A. O'Brien
Attorney

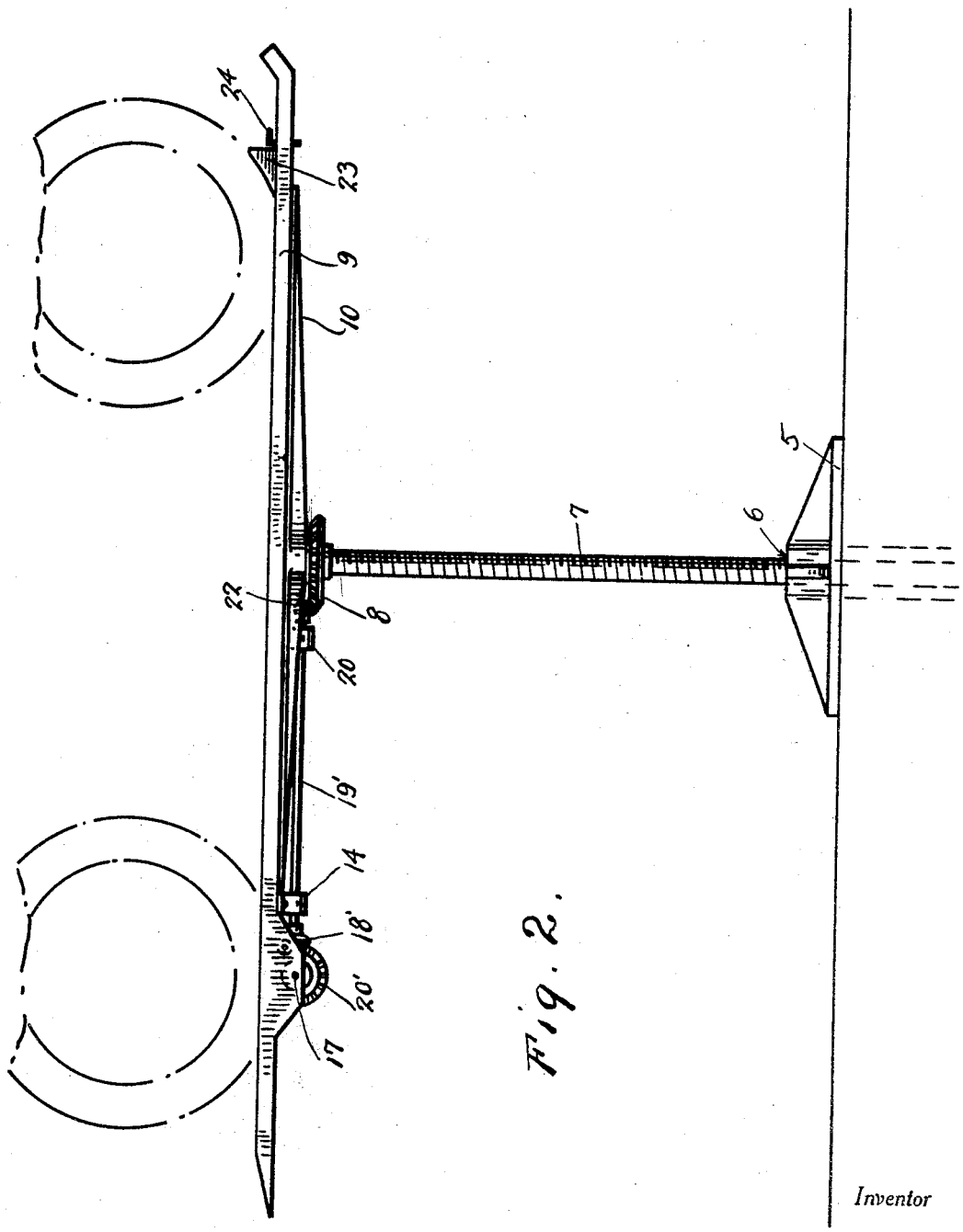

Dec. 13, 1932. J. F. WILLIAMS 1,890,963
AUTOMOBILE LIFT
Filed July 17, 1931 3 Sheets-Sheet 3
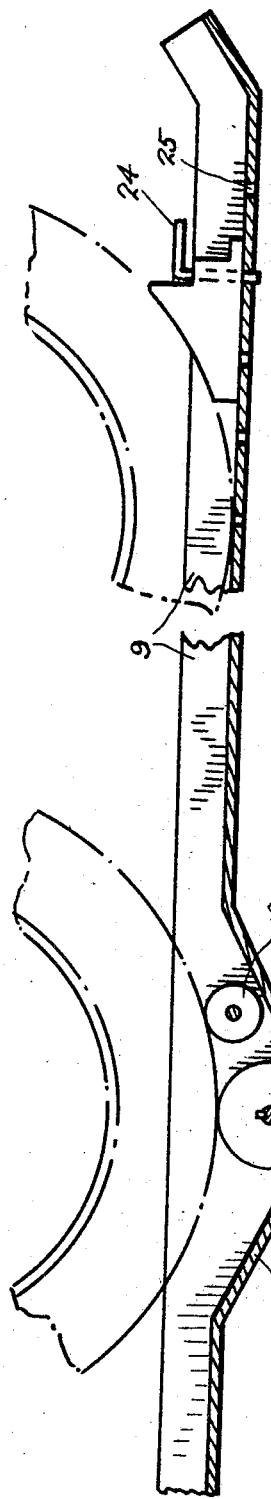
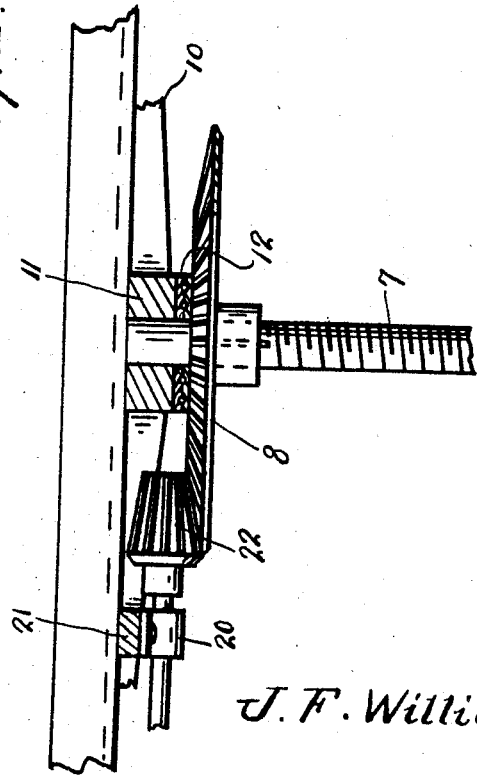
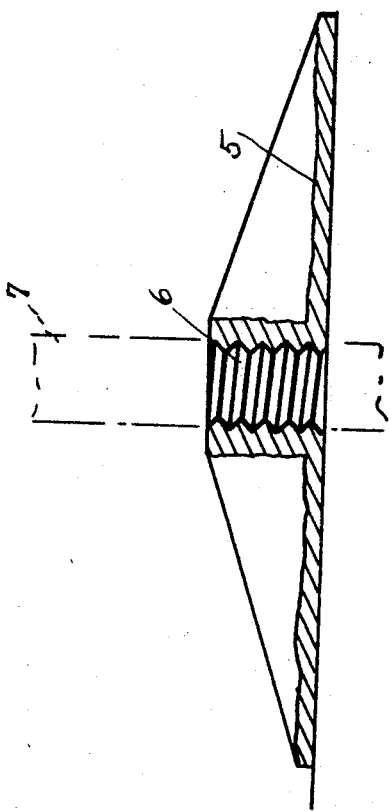
Inventor
J. F. Williams
By Clarence A. O'Brien
Attorney

UNITED STATES PATENT OFFICE

JOSH F. WILLIAMS, OF LEXINGTON, MISSISSIPPI, ASSIGNOR OF ONE-HALF TO DEWITT BUCK, OF LEXINGTON, MISSISSIPPI

AUTOMOBILE LIFT

Application filed July 17, 1931. Serial No. 551,476.

The present invention relates to an apparatus for lifting automobiles in service stations, in garages and other places where it may be desirable to obtain access to parts under the automobile for greasing, repair and similar purposes.

The object of the invention resides in the provision of an apparatus of this nature which is exceedingly simple in its construction, inexpensive to manufacture, strong and durable, compact and convenient in its arrangement of parts thoroughly efficient and reliable in operation, adjustable for accommodating different automobiles, and otherwise well adapted to the purpose for which it is designed.

Another very important object of the invention resides in the provison of an apparatus of this nature having means whereby the apparatus is caused to lift the automobile by the power of the automobile.

With the the above and numerous other objects in view as will appear as the description proceeds, the invention resides in certain novel features of construction, and in the combination and arrangement of parts as will be hereinafter more fully described and claimed.

In the drawings:

Figure 2 is a side elevation thereof.

Figure 3 is a longitudinal section through one of the tracks.

Figure 4 is an enlarged detail section taken substantially on the line 4—4 of Figure 1, and Figure 5 is a detail section through the base.

Figure 1:
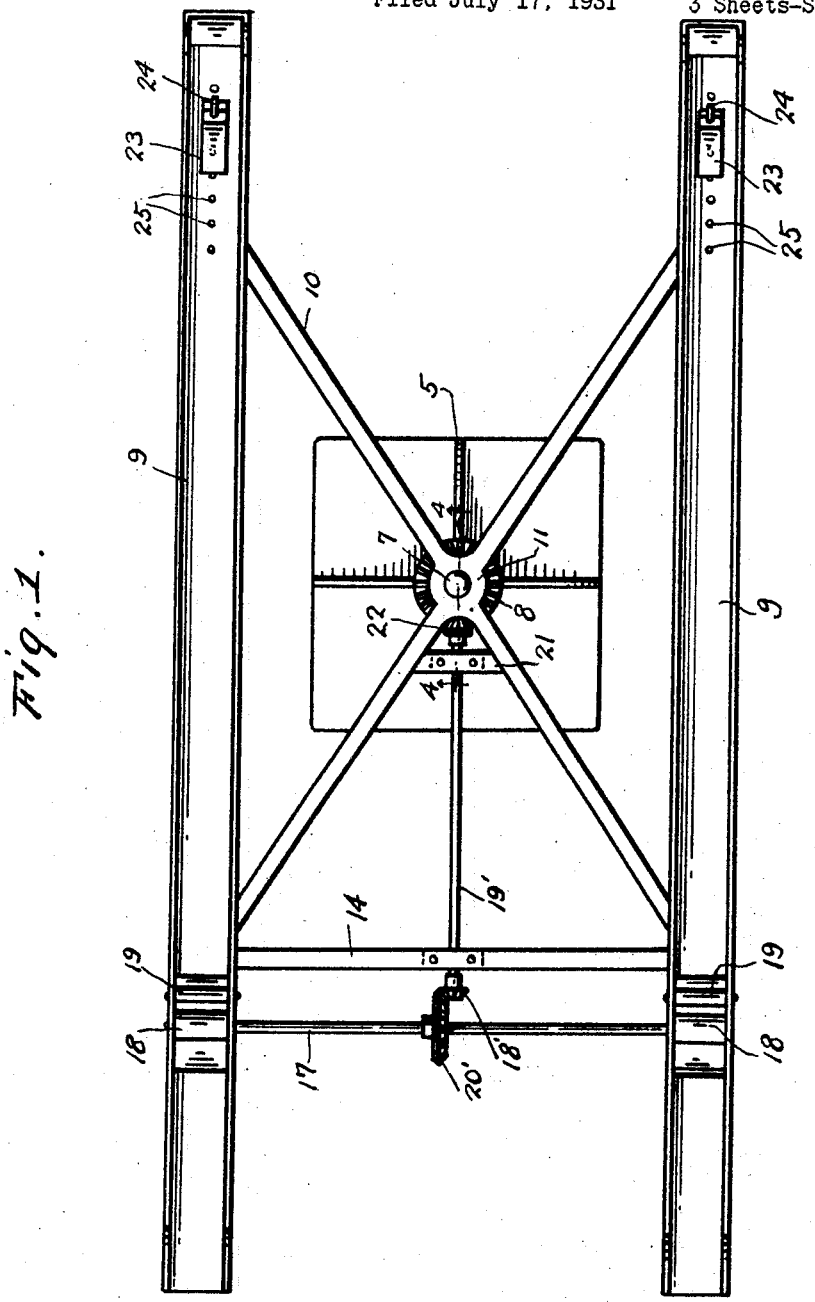
Figure 1 is a top plan view of the apparatus embodying the features of my invention.

Referring to the drawings in detail it will be seen that the numeral 5 denotes a base provided with a vertically disposed internally threaded bore 6 for receiving an elongated threaded jack shaft 7 on the upper end portion of which is keyed a beveled gear 8.

A rack comprises a pair of spaced parallel coextensive channel tracks 9 connected together by diagonal brace structure 10 in the center of which is formed a bearing 11 in which is journalled the upper extremity of the jack shaft 7. A thrust bearing 12 is disposed between the gear 8 and the bearing 11. A cross bar 14 is disposed between the tracks 9. Each track 9 is provided adjacent one end with a stump like depending portion 15 open at the bottom as at 16. A shaft 17 is journalled in these stump like portions 15 to extend between the track and in the stump like portions there is mounted on the shaft rollers 18 keyed thereto. Idler rollers 19 are also mounted in the stump like portions 15 adjacent the rollers 18. A bevel gear 20 on the central portion of the shaft 17 meshes with a bevel pinion 18 on a shaft 19 journalled in bearings 20 under the cross member 14 and another cross member 21 in the brace structure 10. A bevel pinion 22 on the other end of the shaft 19 meshes with a bevel gear 8.

A chock 23 is provided in each track 9 and has a slidable pin 24 therein which may be projected in any one of a plurality of openings 25 provided in a longitudinal series in the bottom of the track.

The automobile is run on to the rack until the rear wheels rest on the rollers 18 and 19 and then the chocks 23 are adjusted to engage the front wheel. The automobile is then placed in low gear and the clutch let in slowly causing the rotation of the rear wheels and therefore causing the rotation of the jack shaft 7 causing the rack to be lifted as will be quite apparent. To lower the automobile, of course, the automobile is placed in reverse and the clutch let in slowly.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, in the combination and arrangement of parts may be resorted to without departing from the spirit or scope of the invention as hereinafter claimed or sacrificing any of its advantages.

Having thus described my invention, what I claim as new is:

In an automobile rack, a pair of spaced parallel tracks and a cross bar secured rigidly at the ends thereof to said tracks, traction devices carried by said tracks, a cross shaft having connection with said traction devices, a longitudinally extending shaft rotatably connected to said cross member and operatively connected to said cross shaft, a spider connected to said tracks, a lifting screw connected to said spider, a driving connection between said longitudinally extending shaft and said screw, and means carried by said spider to rotatably support one end portion of said longitudinally extending shaft.

In testimony whereof I affix my signature.

JOSH F. WILLIAMS.